US012285710B1

(12) United States Patent
Ahn et al.

(10) Patent No.: US 12,285,710 B1
(45) Date of Patent: Apr. 29, 2025

(54) FILTER FOR CARBON DIOXIDE ADSORPTION (71) Applicant: INDUSTRY-ACADEMIC COOPERATION FOUNDATION, CHOSUN UNIVERSITY, Gwangju (KR)

(72) Inventors: Dong Gyu Ahn, Gwangju (KR); Jeong Won Lee, Gwangju (KR); Chang Lae Kim, Gwangju (KR); Sung Yong Jung, Gwangju (KR)

(73) Assignee: INDUSTRY-ACADEMIC COOPERATION FOUNDATION, CHOSUN UNIVERSITY, Gwangju (KR)

( * ) Notice: Subject to any disclaimer, the term of this patent is extended or adjusted under 35 U.S.C. 154(b) by 0 days.

(21) Appl. No.: 18/961,688

(22) Filed: Nov. 27, 2024

(30) Foreign Application Priority Data

Jan. 23, 2024 (KR) ........................ 10-2024-0009917

(51) Int. Cl.
*B01D 53/04* (2006.01)
*B01D 39/20* (2006.01)
*B01D 46/00* (2022.01)
*B01D 46/58* (2022.01)

(52) U.S. Cl.
CPC ..... *B01D 46/0036* (2013.01); *B01D 39/2027* (2013.01); *B01D 46/0001* (2013.01); *B01D 46/58* (2022.01); *B01D 53/04* (2013.01); *B01D 2239/0478* (2013.01); *B01D 2253/20* (2013.01); *B01D 2257/504* (2013.01)

(58) Field of Classification Search
CPC ....................... B01D 46/0036; B01D 46/0001; B01D 46/58; B01D 39/2027; B01D 53/04; B01D 53/62; B01D 2239/0478; B01D 2253/20; B01D 2253/25; B01D 2253/34; B01D 2253/342; B01D 2253/3425; B01D 2257/507
USPC ................. 55/522; 96/154; 95/139; 423/230
See application file for complete search history.

(56) References Cited

U.S. PATENT DOCUMENTS

| 7,326,280 | B2* | 2/2008 | Hrycak | B01J 20/041 |
| | | | | 96/108 |
| 9,011,583 | B2* | 4/2015 | Halder | B01J 20/28045 |
| | | | | 95/139 |
| 2005/0092176 | A1* | 5/2005 | Ding | B01J 20/20 |
| | | | | 96/108 |

(Continued)

FOREIGN PATENT DOCUMENTS

| KR | 10-0562020 | 3/2006 |
| KR | 10-0879312 | 1/2009 |

(Continued)

*Primary Examiner* — Frank M Lawrence, Jr.
(74) *Attorney, Agent, or Firm* — LEX IP MEISTER, PLLC (57) ABSTRACT The filter for carbon dioxide adsorption according to the present invention is composed of multiple unit filters that are mutually connected and stacked, and the unit filters include a repeating three-dimensional patterned part formed using one selected from vat photopolymerization, powder bed fusion, or additive manufacturing processes; flow paths formed in the three-dimensional patterned part; a three-dimensional exposed surface that is exposed to the mixed gas flowing through the flow paths; and a carbon dioxide adsorption layer coated on the exposed surface.

5 Claims, 6 Drawing Sheets (56) References Cited

U.S. PATENT DOCUMENTS

| | | | | |
|---|---|---|---|---|
| 2009/0249954 A1* | 10/2009 | Gadkaree | ............... | B01D 53/64 |
| | | | | 95/134 |
| 2012/0222554 A1* | 9/2012 | Leta | .................. | B01D 53/0462 |
| | | | | 95/114 |
| 2015/0139862 A1* | 5/2015 | Chen | .................... | B01J 20/2804 |
| | | | | 422/180 |
| 2019/0358576 A1* | 11/2019 | Ehteshami | ............... | B01J 20/26 |
| 2024/0198275 A1* | 6/2024 | Scotti | ................. | B01D 53/0462 |

FOREIGN PATENT DOCUMENTS

| | | | | |
|---|---|---|---|---|
| KR | 10-2012-0054958 | | 5/2012 | |
| KR | 10-2022-0095820 | | 7/2022 | |
| WO | WO-2016076994 A1 * | | 5/2016 | ............. B01D 53/04 |
| WO | WO-2022192408 A2 * | | 9/2022 | ............. B01D 53/02 |

* cited by examiner

FIG. 7

FILTER FOR CARBON DIOXIDE ADSORPTION

TECHNICAL FIELD

The present invention relates to a filter for carbon dioxide adsorption, and more specifically, to a filter for carbon dioxide adsorption that improves adsorption efficiency by increasing the physical contact surface area using morphological and fluid dynamic methods.

BACKGROUND ART

In general, techniques such as absorption techniques using amine solutions, adsorption techniques using adsorbents, and membrane separation techniques are used to capture carbon dioxide, which is the main culprit of global warming.

The absorption technique has disadvantages in that it consumes a lot of energy for the regeneration of the absorption solution, has low stability, and causes corrosion of the equipment.

The adsorption technique has advantages in that it consumes less energy for the capture of carbon dioxide, allows the adsorbent to be regenerated and used repeatedly, and produces almost no reaction by-products.

Adsorbents used in the adsorption technique include activated carbon, zeolites, porous polymeric silica, graphene oxide, and metal-organic frameworks (MOFs).

Additionally, substances such as sodium hydroxide, potassium hydroxide, and lithium hydroxide are also used as carbon dioxide adsorbents, as they can efficiently adsorb carbon dioxide through chemical reactions.

Korean Patents No. 10-0562020 and No. 10-0879312 disclose carbon dioxide immobilization adsorbents and methods for their preparation. These prior documents disclose a technical configuration that allows the addition of chemical adsorption performance to physical adsorbents by using zeolites for ion exchange.

Korean Patent Publication No. 10-2022-0095820 discloses a filter for carbon dioxide adsorption and a method for manufacturing the same. The manufacturing method of the carbon dioxide adsorption filter described in the prior document includes the steps of: mixing a metal precursor, a coordination complex of an organic acid, and a material containing the counterion of the coordination complex in a solvent to produce a first mixture; irradiating the first mixture with microwaves to produce a porous adsorbent; mixing the porous adsorbent with a polymer to produce a second mixture; and electrospinning the second mixture.

In this conventional technology of carbon dioxide adsorption filters, the porous adsorbent and polymer mixture is electro-spun to grow the porous adsorbent into a mat form, but there is a limitation in increasing the surface area and in expanding the capacity.

Korean Patent Publication No. 10-2012-0054958 discloses a method for preparing a carbon dioxide adsorbent. The method for preparing the adsorbent comprises dispersing an alkali metal hydroxide in an organic solvent, mixing a physical carbon dioxide adsorbent with it to support the hydroxide on the physical carbon dioxide adsorbent, and then drying it.

However, such carbon dioxide adsorbents have a simple surface, which makes it difficult to improve the contact efficiency for carbon dioxide adsorption.

DETAILED DESCRIPTION OF THE INVENTION

Technical Problem

The present invention aims to solve the above-described problems by providing a filter for carbon dioxide adsorption that can enhance the adsorption performance of carbon dioxide by physically increasing the contact surface area with carbon dioxide using morphological and fluid dynamic methods, thereby expanding the contact area with the mixed gas containing carbon dioxide.

Another objective of the present invention is to provide a filter for carbon dioxide adsorption that can improve the scalability of capacity by arranging unit filters for carbon dioxide adsorption in a continuous manner.

Technical Solution

The filter for carbon dioxide adsorption of the present invention, which achieves the above objectives, is composed of multiple unit filters that are connected and stacked, wherein each unit filter includes a three-dimensional patterned part with flow paths through which mixed gas passes, and the flow paths have a three-dimensional exposure surface. A carbon dioxide adsorption layer is coated on the surface of the exposed area.

In the present invention, the unit filter can be made of aluminum-silicon alloy, stainless steel, stainless steel alloy, or synthetic resin, and it is particularly preferred to be made of an AlSi10Mg alloy.

The carbon dioxide adsorption layer is preferably formed by spray-coating or dip-coating a coating solution, which is a mixture of a porous framework, an amine material for carbon dioxide adsorption, and a solvent, onto the exposed surface of the flow paths.

The exposed surface of the flow paths formed on the unit filter can be pretreated with a sodium hydroxide solution and etched with hydrochloric acid solution so that the aluminum on the surface is etched, exposing a predetermined pattern of silicon.

An upper partition plate and a lower partition plate can be installed on the upper and lower sides of the three-dimensional patterned part of the unit filter.

Meanwhile, the three-dimensional patterned part of the unit filter has a three-dimensional repeated inner structure (RIS), and the internal structure consists of a first unit filter member having first protrusions formed in a predetermined pattern on one side of a first substrate, and a second unit filter member having second protrusions, which are spaced at a predetermined interval from the first protrusions and positioned between the first protrusions, formed on a second substrate that is coupled to the first substrate. This creates a self-circulating flow path that is interfered by the first and second protrusions between the first and second substrates.

Advantageous Effects

The filter for carbon dioxide adsorption according to the present invention forms a flow path through which a mixed gas containing carbon dioxide (hereinafter referred to as "mixed gas") flows, using a three-dimensional patterned part with a repeating three-dimensional shape. Since the carbon dioxide adsorption layer is formed on the surface of the flow path, specifically on the exposed surface of the three-dimensional shape, the specific surface area for contact with the mixed gas can be relatively enlarged.

Additionally, since the three-dimensional patterned part forming the flow path has a repeating structure, it can prevent a decrease in adsorption efficiency caused by partial blockages in the flow path, which would lead to localized pressure drops.

Furthermore, the filter for carbon dioxide adsorption according to the present invention can increase the contact and retention time with the carbon dioxide adsorption layer through the self-circulation of the mixed gas, thereby enhancing the adsorption efficiency of carbon dioxide per unit area.

BEST MODE

The present invention relates to a filter for carbon dioxide adsorption, and one embodiment is shown in FIGS. 1 to 5.

Figure 1:
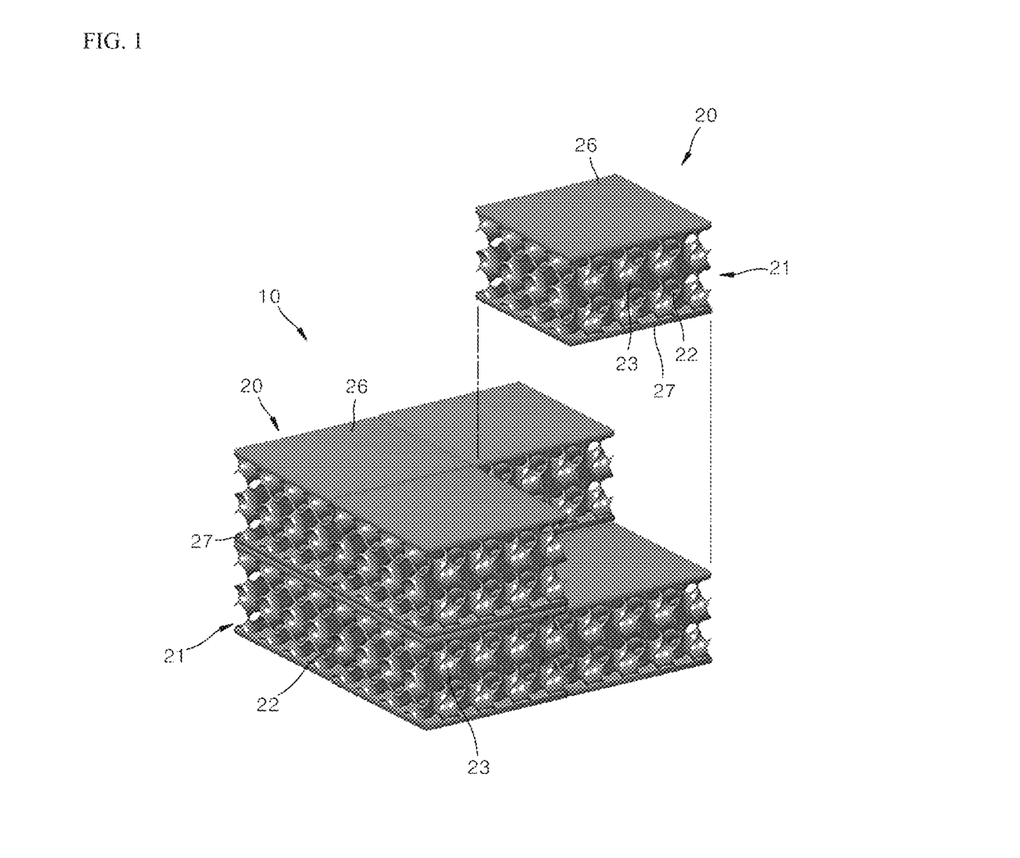
FIG. 1 is an exploded perspective view showing the filter for carbon dioxide adsorption according to the present invention.
Figure 2:
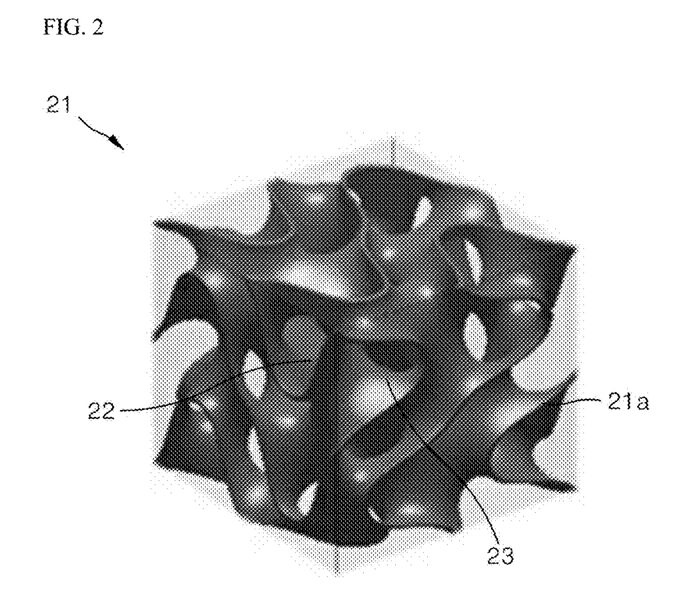
FIG. 2 is an enlarged perspective view showing the three-dimensional patterned part of the unit filter depicted in FIG. 1.
Figure 3:
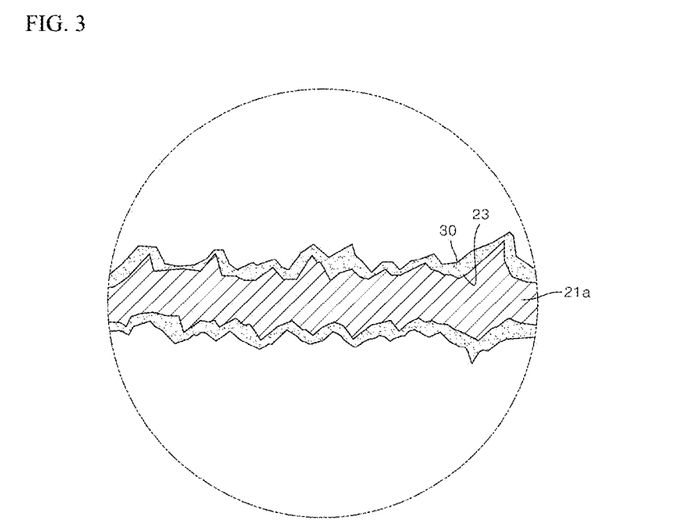
FIG. 3 is a sectional view showing the exposed surface of the three-dimensional patterned part of FIG. 2.

Referring to FIGS. 1 to 3, the filter for carbon dioxide adsorption (10) according to the present invention comprises a structure in which multiple unit filters (20), which can increase the specific surface area to enhance the adsorption capacity of carbon dioxide contained in the mixed gas, are mutually connected and stacked.

Each unit filter (20) includes a three-dimensional patterned part (21) in which flow paths (22), through which the mixed gas containing carbon dioxide passes, are formed. The flow paths (22) formed in the three-dimensional patterned part (21) have a three-dimensional exposed surface (23), and an adsorption layer (30) for adsorbing carbon dioxide from the mixed gas is formed on the surface of the exposed surface (23).

The three-dimensional patterned part (21), in which the flow paths (22) of the unit filter (20) are formed, can be formed using one of the following processes: Vat Photopolymerization, powder bed fusion, or additive manufacturing processes.

As shown in FIGS. 1 and 2, the three-dimensional patterned part (21) of the unit filter (20) is composed of a porous body with irregular ribs (21a) of substantially uniform thickness, and the pores of this porous body are interconnected to form the flow paths (22). Moreover, an upper partition plate (26) and a lower partition plate (27) are formed on the upper and lower sides of the irregular ribs (21a), which interconnect the pores.

Thus, the flow paths (22) formed in the unit filter (20) have a structure in which they communicate in the forward and rearward directions and the left-right direction, except for the upper and lower directions, which are partitioned by the upper and lower partition plates (26) and (27). Therefore, when the unit filters (20) are connected and stacked, the flow paths (22) are interconnected in the left-right direction and the rearward direction from the inlet side.

Figure 4:
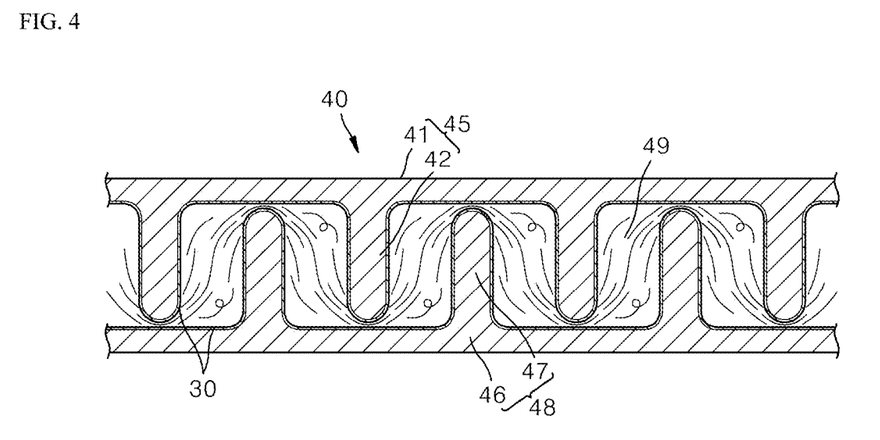
FIG. 4 is a sectional view showing another embodiment of the three-dimensional patterned part of the unit filter according to the present invention.

The unit filter is not limited to the aforementioned embodiment and can have a three-dimensional repeated inner structure (RIS). As shown in FIG. 4, the unit filter (40) with a repeated inner structure is composed of a first unit filter member (45) having first protrusions (42) formed in a predetermined pattern on one side of a first substrate (41), and a second unit filter member (48) having a second substrate (46) with second protrusions (47) that are interleaved with the first protrusions (42). The unit filter (40) can have a self-circulation structure in the flow path (49), where the first and second protrusions (42)(47) exposed in the flow path (49) are spaced apart by the coupling of the first and second unit filter members (45)(48) at a predetermined interval.

Meanwhile, as the material of the unit filter (20), metals, metal alloys, non-ferrous metals such as aluminum, non-ferrous metal alloys, and synthetic resins can be used. Preferably, stainless steel, stainless steel alloys, AlSi10Mg alloy (ASTM; American Society for Testing and Materials), or aluminum alloys with chemical composition according to F3318 are used.

AlSi10Mg alloy can be composed of 90% aluminum, 9% silicon, and 1% magnesium. Considering mechanical properties and corrosion resistance, small amounts of other elements such as iron, copper, and zinc may also be included in the AlSi10Mg alloy.

Meanwhile, it is preferable to widen the specific surface area (surface area/mass) of the carbon dioxide adsorption layer (30) by etching the three-dimensional exposed surface (23) of the flow path (22) formed in the unit filter (20).

The etching method of the exposed surface (23) of the unit filter (20) may vary depending on the material of the unit filter (20).

In order to widen the specific surface area of the exposed surface (23) of a unit filter (20) made of AlSi10Mg material using one of 3D printing, vat photopolymerization, powder bed fusion, or additive manufacturing processes, impurities on the exposed surface are removed using ethanol and deionized water. The surface is then pretreated by etching with a sodium hydroxide solution and subsequently etched using a hydrochloric acid solution or nitric acid solution, as shown in FIG. 5, to obtain an etched structure on the exposed surface (23).

Specifically, the unit filter (20) made of AlSi10Mg material is immersed in a 1 mol/L sodium hydroxide (NaOH) solution at room temperature (25° C.) for 1 minute and then washed in ultrapure water. The unit filter (20) is then immersed in a 3 mol/L hydrochloric acid (HCl) solution at room temperature for approximately 5 minutes to etch it, and then washed again in ultrapure water. The wet surface of the unit filter is dried in a drying oven maintained at 60° C. for 20 to 40 minutes.

Figure 5:
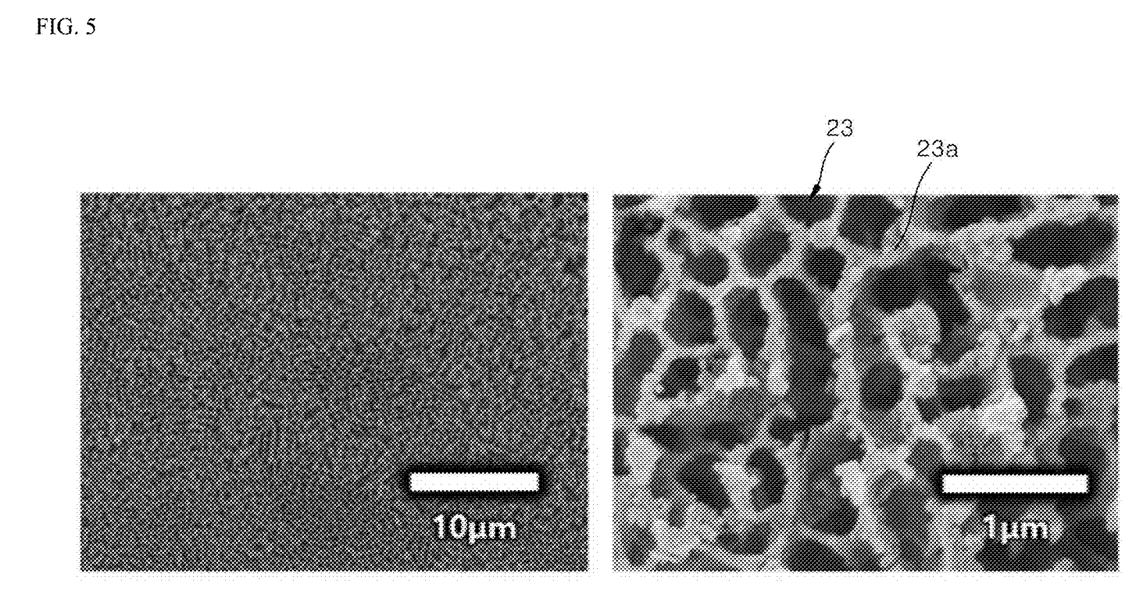
FIG. 5 is an enlarged view showing the etched and treated state of the exposed surface of the three-dimensional patterned part of the unit filter depicted in FIG. 1.

Referring to FIG. 5, it can be seen that the specific surface area of the exposed surface (23) of the unit filter (10) increases as a predetermined silicon pattern (23a) is exposed due to the pretreatment with sodium hydroxide solution and aluminum etching with hydrochloric acid solution.

Figure 6:
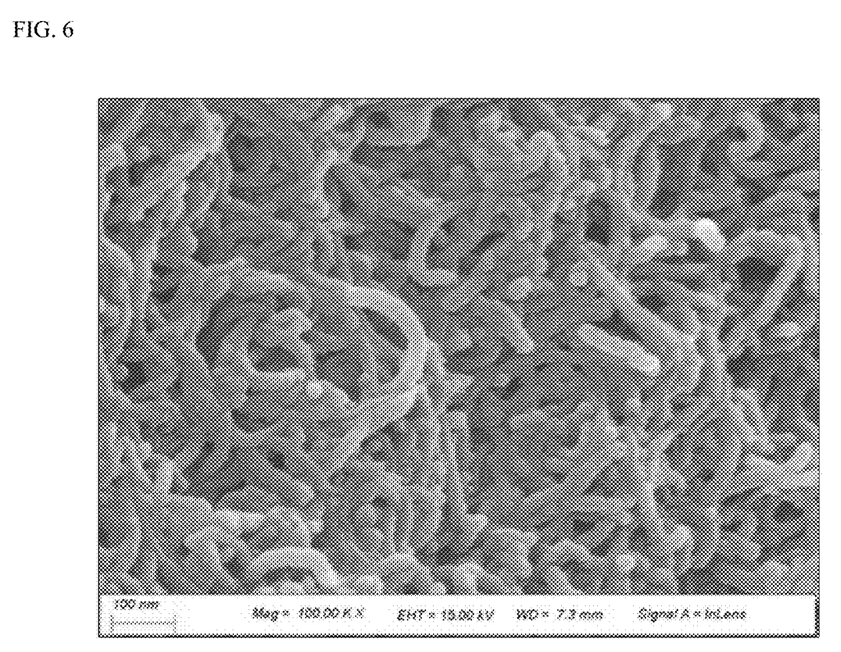
FIG. 6 is an enlarged view showing the exposed surface of the three-dimensional patterned part of a unit filter made by etching a stainless steel substrate.

FIG. 6 shows the structure of the exposed surface of a unit filter made using a stainless steel (SUS304) substrate, etched to increase the specific surface area.

The carbon dioxide adsorption layer (30) of the unit filter (20) is formed by dip-coating or spray-coating the exposed surface (23) of the flow path (22) with a coating solution composed of a mixture of a porous framework, an amine material for carbon dioxide adsorption, and a solvent.

The porous framework can be selected from carbon nanotubes, graphene, carbon fiber, or MIL-53. The amine material can include at least one amine group containing at least one functional group of R1-NH2, R1-N(R2)H, and R1-N(R2)-R3, such as tetraethylenepentamine, diethanolamine, monoethanolamine, tetraethylenepentamine, or N-methyldiethanolamine. The solvent may be ethanol, isopropyl alcohol, acetone, or distilled water.

Silane coupling agents, tetraethyl orthosilicate, and surfactants may be added to the coating solution, and the weight ratios of each material and the adsorption layer process are as follows:

50 to 95 wt % solvent, 0.1 to 5 wt % framework, 1 to 40 wt % amine, 0.01 to 3 wt % silane coupling agent, 0.01 wt % tetraethyl orthosilicate, and 0.01 to 1 wt % surfactant are mixed, stirred at a rotational speed of 100 to 500 rpm for 30 minutes to 6 hours, and ultrasonically treated.

Example 1

The preparation and process for the coating solution to form the carbon dioxide adsorption layer (30) coated on the exposed surface (23) of the unit filter (20) can be carried out as follows:

1) Mix at least one selected from carbon nanotubes, graphene, and carbon fiber in 0.1 parts by weight with 100 parts by weight of distilled water and ethanol.
2) Stir the mixture at 300 rpm at 100° C. to prepare a solution. Then, mix 0.1 to 40 parts by weight of an amine material with 100 parts by weight of this solution, perform ultrasonic treatment for about 30 minutes, and dry it to powder.
3) To form the carbon dioxide adsorption layer (30) on the exposed surface (23) of the unit filter (20), mix the dried powder with ethanol, isopropyl alcohol, surfactant, and binder, and stir at 400 rpm at 150° C. to 250° C. for 4 to 8 hours, while performing ultrasonic treatment for 30 to 60 minutes.

Figure 7:
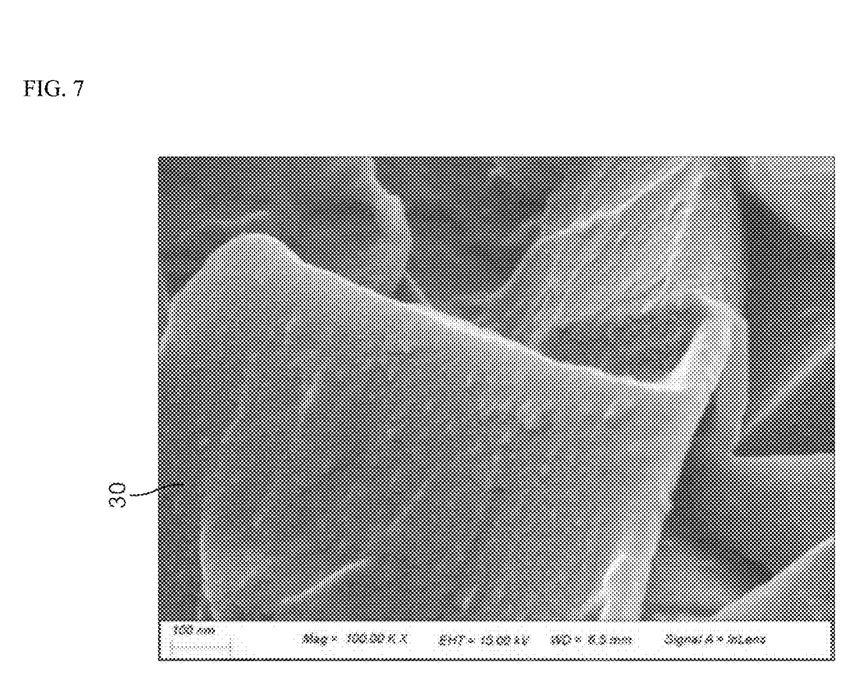
FIG. 7 is an enlarged view showing the state in which the adsorption layer is formed on the exposed surface of the three-dimensional patterned part depicted in FIG. 5.

FIG. 7 is a photograph showing the state where the adsorption layer is formed by dip-coating the coating solution, prepared as described above, on an AlSi10Mg alloy substrate.

Example 2

The preparation and process for the coating solution to form the carbon dioxide adsorption layer (30) coated on the exposed surface (23) of the unit filter (20) can be carried out as follows:

1) Mix terephthalic acid, $Al(NO_3)_3 \cdot 9H_2O$, dimethylformamide, and distilled water, heat the mixture at 150° C. for 30 hours, and wash it twice each with dimethylformamide, methanol, and acetone.
2) Heat this solution at 50° C. for 24 hours and then ball-mill it to powder.
3) To form the carbon dioxide adsorption layer (30) on the exposed surface (23) of the unit filter (20), mix the powder with ethanol, distilled water, MIL-53, a curing agent, a surfactant, and a binder, stir the mixture at 400 rpm at 150° C. to 250° C. for 4 to 8 hours, and perform ultrasonic treatment for 30 to 60 minutes.

As in this example, the coating solution is spray-coated or dip-coated on the exposed surface (23) of the flow path (22) to form the carbon dioxide adsorption layer (30).

As described above, the filter for carbon dioxide adsorption according to the present invention can be manufactured by mutually connecting or stacking the unit filters (20), thereby increasing the scalability of the filter in terms of shape and size.

In particular, the specific surface area of the exposed surface (23) of the flow path (22), through which the mixed gas containing carbon dioxide passes, is increased, and thus the surface area of the carbon dioxide adsorption layer (30) coated on the exposed surface (23) can be enlarged. Additionally, the unit filter (20) with a three-dimensional RIS structure has a configuration that induces the self-circulation of the mixed gas, which increases the contact and retention time with the carbon dioxide adsorption layer, thereby enhancing the carbon dioxide adsorption performance.

Furthermore, since the flow path (22) can be uniformly formed by the repeating three-dimensional patterned part, the flow path of the unit filter can prevent the increase in flow pressure of the mixed gas by preventing partial blockages.

Although the present invention has been described with reference to the embodiments shown in the drawings, it is merely exemplary, and it will be understood by those skilled in the art that various modifications and equivalent alternative embodiments are possible from this. Therefore, the true technical scope of the present invention should be determined by the technical spirit of the appended claims.

The invention claimed is:

1. A filter for carbon dioxide adsorption comprising multiple unit filters that are connected and stacked;
   wherein the unit filters include a three-dimensional patterned part with flow paths through which a mixed gas passes;
   the flow paths have a three-dimensional exposed surface; and
   a carbon dioxide adsorption laver is coated on the surface of the exposed area:
   wherein each of the unit filters is made of AlSi10Mg alloy.
2. The filter for carbon dioxide adsorption according to claim 1; and
   wherein the carbon dioxide adsorption layer is formed by spray-coating or dip-coating a coating solution, which is a mixture of a porous framework, an amine material for carbon dioxide adsorption, and a solvent, onto the exposed surface of the flow paths.
3. The filter for carbon dioxide adsorption according to claim 1; and
   wherein the exposed surface of the flow paths formed in each of the unit filters is pretreated with a sodium hydroxide solution and etched with a hydrochloric acid solution, so that the aluminum on the surface is etched, exposing a predetermined pattern of silicon.
4. The filter for carbon dioxide adsorption according to claim 1; and
   wherein an upper partition plate and a lower partition plate are respectively installed on the upper and lower sides of the three-dimensional patterned part of each of the unit filters.

5. The filter for carbon dioxide adsorption according to claim 1;
- wherein the three-dimensional patterned part of each of the unit filters has a three-dimensional repeated inner structure (RIS); and
- the inner structure consisting of a first unit filter member having first protrusions formed in a predetermined pattern on one side of a first substrate, and a second unit filter member having second protrusions, which are spaced at a predetermined interval from the first protrusions and positioned between the first protrusions, formed on a second substrate that is coupled to the first substrate, so that a self-circulating flow path interfered by the first and second protrusions is formed between the first and second substrates.

* * * * *